July 31, 1934.   R. J. HERBOLD   1,968,342
ILLUMINATED MIRROR
Filed Nov. 8, 1933   3 Sheets-Sheet 1
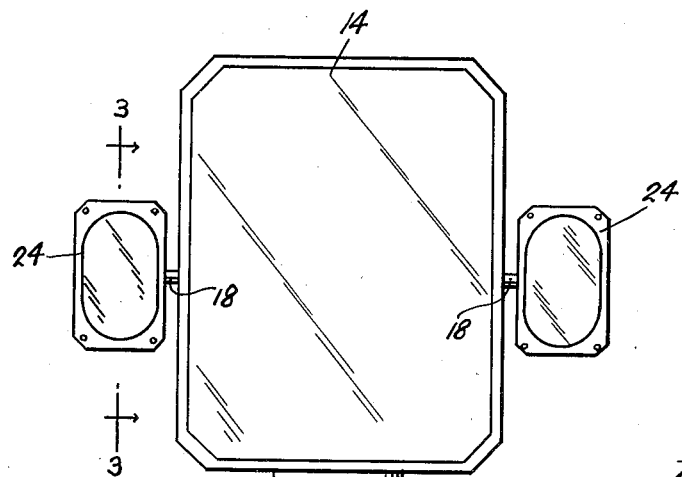
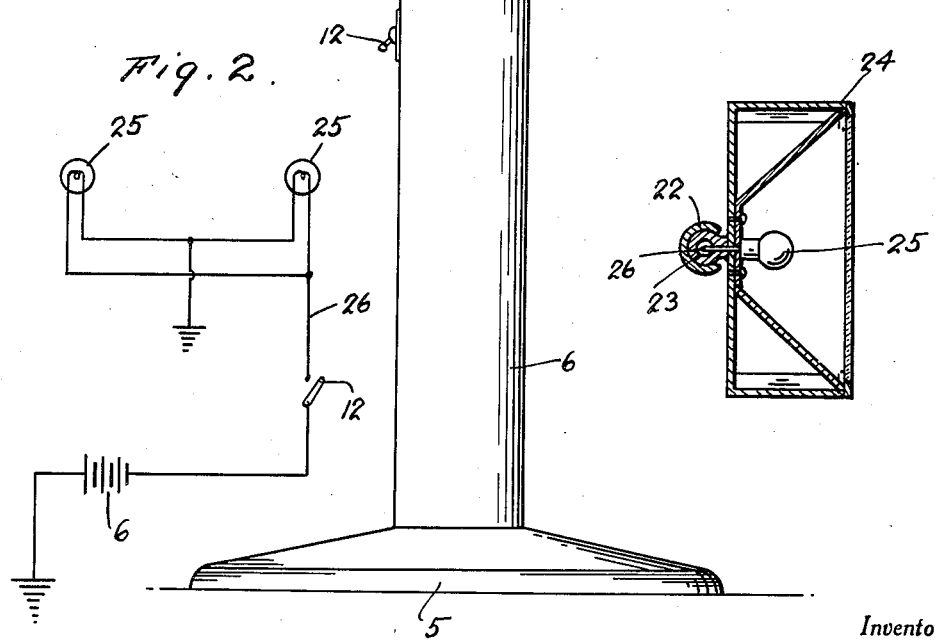
Inventor
R. J. Herbold
By Clarence A. O'Brien
Attorney July 31, 1934.  R. J. HERBOLD  1,968,342
ILLUMINATED MIRROR
Filed Nov. 8, 1933  3 Sheets-Sheet 3
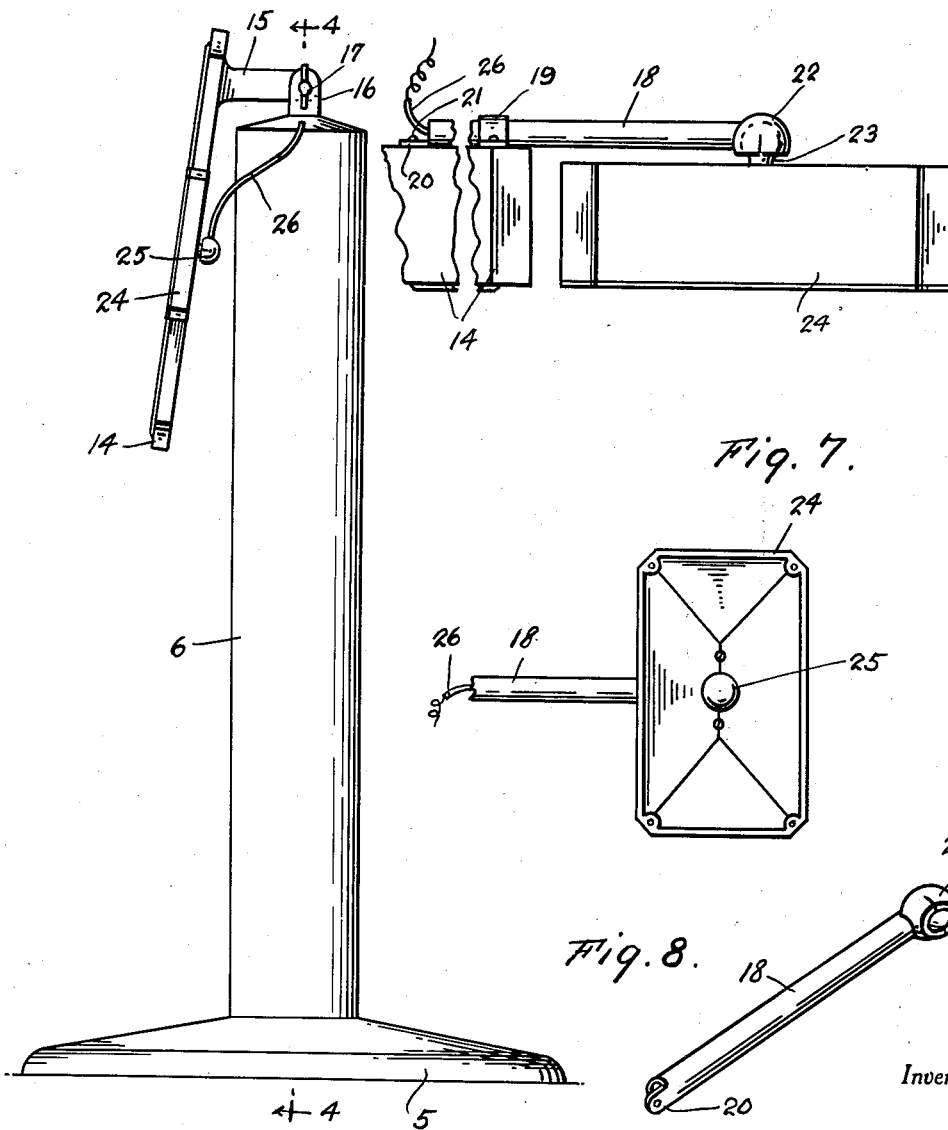
Inventor
R. J. Herbold
By Clarence A. O'Brien
Attorney Patented July 31, 1934

1,968,342

UNITED STATES PATENT OFFICE 1,968,342

ILLUMINATED MIRROR

Robert James Herbold, Oak Creek, Colo.

Application November 8, 1933, Serial No. 697,187

1 Claim. (Cl. 240—4.1)

This invention appertains to new and useful improvements in mirrors, and more particularly to a mirror of the illuminated type.

The principal object of the present invention is to provide a mirror for shaving or other uses having illuminating means and self-contained electrical energy for the illuminating means.

Another important object of the present invention is to provide a mirror of the illuminated type wherein a battery is conveniently installed and concealed for supplying electrical energy to the illuminating means.

These and various other important objects and advantages of the invention will become apparent to the reader of the following specification.

In the drawings:—

Figure 1 represents a front elevational view of the novel mirror.

Figure 2 represents a diagrammatic view disclosing the electrical connection between the electrical devices involved.

Figure 3 represents a vertical sectional view taken substantially on the line 3—3 of Figure 1.

Figure 5 represents a side elevational view of the mirror, looking at the mirror from one edge thereof.

Figure 6 represents a fragmentary top plan view of the mirror, showing the means for supporting one of the side lights.

Figure 7 represents a front elevational view of one of the side mirrors, with its glass removed.

Figure 8 represents a perspective view of one of the side light supporting arms.

Figure 4:
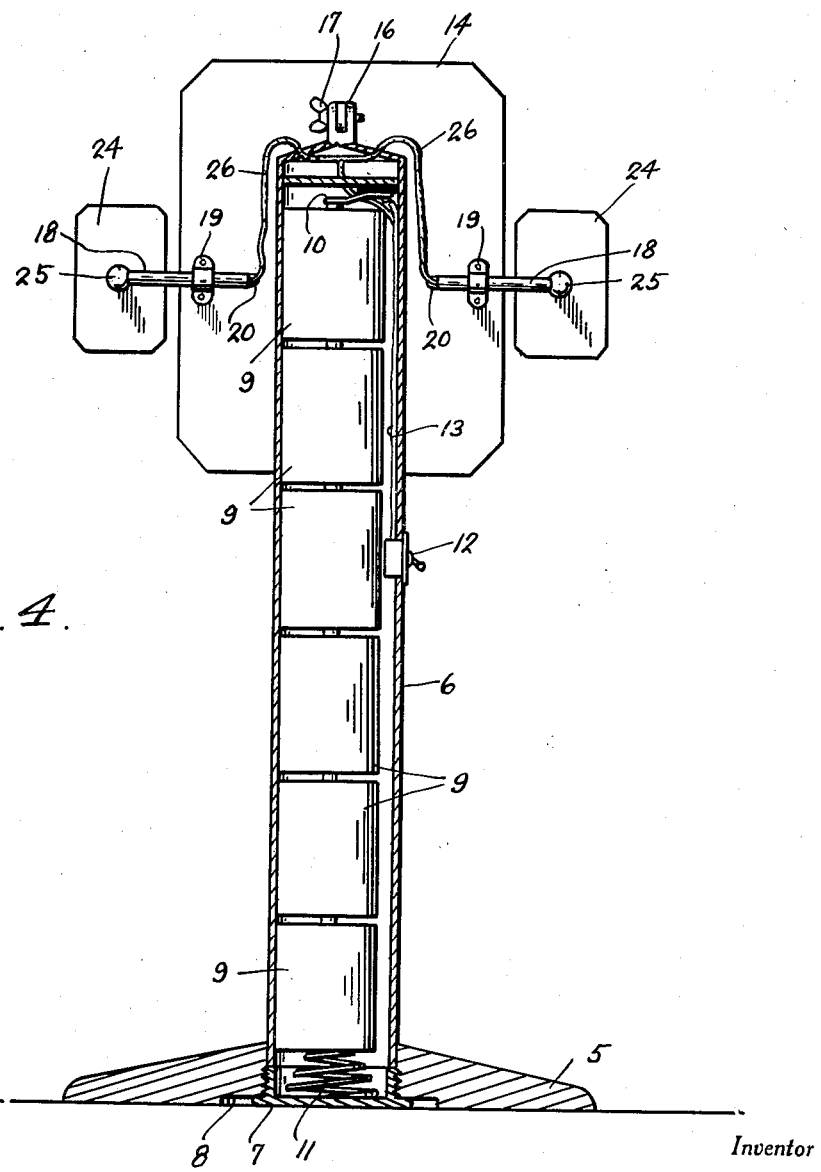
Figure 4 represents a vertical sectional view through the standard of the mirror, showing the battery cells in place.

Referring to the drawings wherein like numerals designate like parts, it can be seen in Figure 4, that numeral 5 represents a base which may be circular or any other suitable shape and provided with a centrally located opening for receiving the lower end portion of the tubular upright 6. The bottom side of the base is provided with a threaded opening for receiving the threaded portion of the hollow plug 7, the head of which is received by the countersunk portion 8 in the base.

When this plug 7 is removed, the battery cells 9 can be placed in the upright 6. The batteries are assembled in the usual carbon to zinc relation, the uppermost cell having its carbon engaging a spring contact finger 10, while a spring 11 in the plug 7 electrically connects the zinc side of the lowermost battery to the upright 6, which is of metal, and supports the switch 12, which controls the light circuit.

Numeral 14 represents a large mirror which has an arm 15 projecting from the back and connected to the ears 16 at the top of the upright 6 by a bolt 17.

As is clearly shown in Figure 6, an arm 18 extends laterally from each side of the mirror and each of these arms is connected by a U-clamp 19 to the back side of the mirror so that a substantial portion of the arm will project beyond the edge portion of the mirror 14.

Each of these arms 18 is of tubular construction and provides with an apertured ear 20 at its inner end so that a suitable securing element 21 can be inserted through the opening to further retain the inner end portion of the arm to the mirror back.

The outer end of each of the arms 18 is provided with a ball socket 22 for receiving a ball formation 23 on the back of the small lamp boxes 24. The sockets 22 are split, as at 25, and are of spring material so that they will tensionally engage the balls 23 to the extent that the lamp boxes containing the lamps 25 can be adjusted to any desirable angle.

Connections 26 are made from the bulbs 25 in these lamp boxes to the switch 12.

With this device, the mirror can be carried from place to place without requiring any cord or plug connection with the commercial current supply and in fact, the structure can be conveniently packed and used while traveling.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

A device of the class described comprising a post having a pair of upstanding ears on its upper end, a mirror, an arm having one end attached to the top part of the rear face of the mirror, with its other end extending between the ears, a pivot pin passing through the ears and said end of the arm pivotally connecting the arm to the post, a pair of brackets connected to the rear face of the mirror, one adjacent each side edge thereof, said brackets being in alignment and located substantially midway the ends of the mirror, a tubular arm attached to the back of the mirror by each bracket, said arm projecting beyond the side edges of the mirror, a pair of lamp housings, and a ball and socket joint connecting the rear of each housing with the outer end of an arm.

ROBERT JAMES HERBOLD.